(12) United States Patent
Corbett

(10) Patent No.: US 7,677,043 B1
(45) Date of Patent: Mar. 16, 2010

(54) STEAM POWERED HYBRID VEHICLE

(76) Inventor: Mike C. Corbett, 2336 Kirkland Rd., Dover, FL (US) 33527

( * ) Notice: Subject to any disclaimer, the term of this patent is extended or adjusted under 35 U.S.C. 154(b) by 850 days.

(21) Appl. No.: 11/222,491

(22) Filed: Sep. 8, 2005

(51) Int. Cl.
*F01B 21/04* (2006.01)

(52) U.S. Cl. ...................................................... 60/698

(58) Field of Classification Search ................. 60/597, 60/618, 698
See application file for complete search history.

(56) References Cited

U.S. PATENT DOCUMENTS

| | | | |
|---|---|---|---|
| 4,031,705 A | | 6/1977 | Berg |
| 4,300,353 A | | 11/1981 | Ridgway |
| 4,393,653 A | | 7/1983 | Fischer |
| 4,405,029 A | * | 9/1983 | Hunt .......................... 180/65.2 |
| 5,176,000 A | * | 1/1993 | Dauksis ........................ 60/618 |
| 5,327,987 A | * | 7/1994 | Abdelmalek ................ 180/65.2 |
| 6,450,283 B1 | * | 9/2002 | Taggett ........................ 180/304 |
| 6,834,503 B2 | | 12/2004 | Freymann |

\* cited by examiner

*Primary Examiner*—Hoang M Nguyen

(57) ABSTRACT

The idea within the scope of the present invention is for a vehicle to be driven by an electric motor. An external combustion engine drive a generator which supplies electricity for the electric motor. Surplus energy is stored in the batteries. The external combustion engine would be a preferred gasoline or diesel fueled steam engine. Steam is probably the best currently understood technology for the engine of the present invention. The combination use of steam and electric has advantages. A steam engine takes time to build pressure in a boiler before it can produce power. During this time the batteries will power the electric motor. The system of the present invention overcomes the problem of limited range in a pure electric powered vehicle, inefficiency of an internal combustion powered vehicle and long startup problems of pure steam driven vehicles. The present invention does not require a whole new fuel delivery infrastructure like a hydrogen fuel cell does.

2 Claims, 1 Drawing Sheet

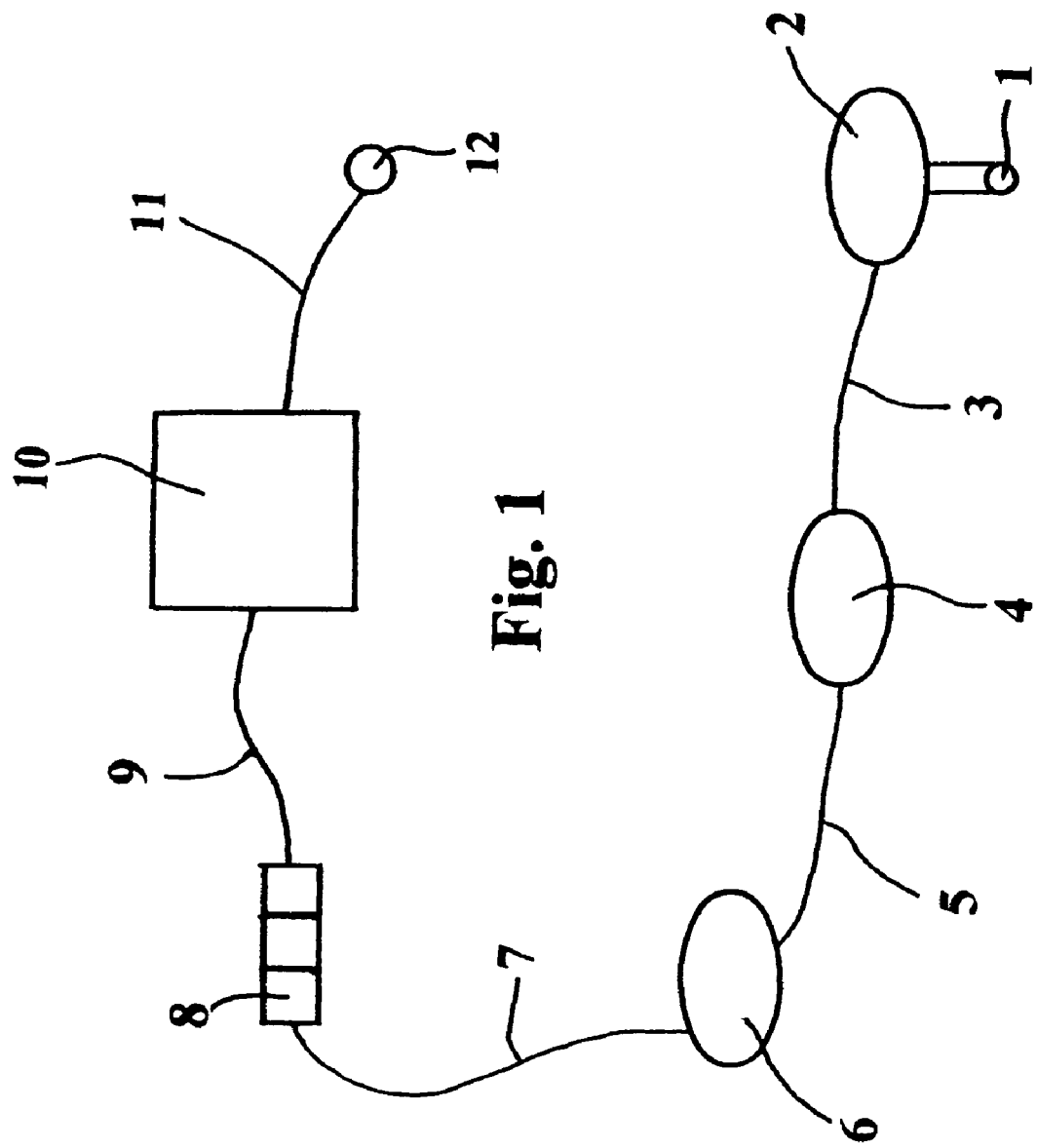

STEAM POWERED HYBRID VEHICLE

BACKGROUND OF THE INVENTION (1) Field of the Invention

The present invention generally relates to power to operate a vehicle and, more particularly pertains to a steam powered hybrid vehicle.

(2) Description of the Prior Art

The present invention is an improvement over U.S. Pat. No. 6,834,503 which discloses a method for the operation of a steam thermal engine for a vehicle power unit. U.S. Pat. No. 4,393,653 discloses a reciprocating external combustion engine. U.S. Pat. No. 4,300,353 discloses a vehicle propulsion system. U.S. Pat. No. 4,031,705 discloses an auxiliary power system for an internal combustion engine.

SUMMARY OF THE INVENTION

In view of the forgoing disadvantages inherent in the known ways of powering a vehicle now present in the prior art, the present invention provides a much more efficient means of operating a vehicle. As such, the general purpose of the present invention, which will be described subsequently in greater detail, is to provide a new and improved means of operating a vehicle apparatus and method of use which has all the advantages of the prior art and none of the disadvantages.

The internal combustion engine used today in vehicles is very inefficient at converting energy stored in gasoline (fuel) to mechanical energy to move the vehicle. Current production vehicles use an internal combustion engine and are too inefficient. Fuel cells are not much more efficient and require use of dangerous hydrogen gas. Other technologies are not much more efficient either. The internal combustion engine has a maximum of 33% thermal efficiency. In other words 66% is wasted in the form of heat. External combustion engines should be capable of at least double that. A steam engine requires fewer moving parts and is cheaper to manufacture because steam is used to drive a generator in a hybrid electric vehicle.

The idea within the scope of the present invention is for a vehicle to be driven by an electric motor driving the wheels. An external combustion engine drives a generator which supplies electricity for the electric motor. Surplus energy is stored in the batteries. The external combustion engine would be a gasoline or kerosene fueled steam engine, although any suitable fuel and engine will do. Alternative fuels may be ethanol or hydrogen. Steam is probably the best currently understood technology for the engine of the present invention. The combination use of steam and electric has advantages. A steam engine takes time to build pressure in a boiler before it can produce power. Water is not the only liquid that can be used in the boiler. The scope of the present invention allows another liquid to be used in the boiler. During this time the batteries will power the electric motor. During normal driving most vehicles are not using their full power capacity. Because of this, the generating engine can be of substantially lower power than a normal powered vehicle. As an example, a car with an electric motor capable of producing 100 horsepower could be supplied by a steam engine as small as 20 horsepower. Testing will be needed to determine the proper ratio.

The system of the present invention overcomes the problem of limited range in a pure electric powered vehicle, inefficiency of an internal combustion powered vehicle and long startup problems of pure steam driven vehicles. The present invention does not require a whole new fuel delivery infrastructure like a hydrogen fuel cell does. The advantage of an external combustion engine is that it requires significantly fewer parts and it does not require the tight tolerances for their parts that internal combustion engines require. This makes the external combustion engine cheaper and easier to manufacture and maintain.

The present invention has the following list of major components parts, comprising, in combination:
(1) A fuel tank
(2) A fuel pump.
(3) A fuel line.
(4) A boiler.
(5) A steam line.
(6) A steam engine.
(7) A vapor recovery line.
(8) A vapor recovery mechanism.
(9) A steam engine output shaft.
(10) A generator.
(11) An electric cable.
(12) A battery pack.
(13) An electric cable.
(14) A motor controller.
(15) An electric cable.
(16) An electric motor.
(17) An electric motor output shaft.
(18) A universal joint.
(19) A driveshaft.
(20) A differential.
(21) A drive axles.
(22) Drive wheels.

Optionally it is possible to place multiple (either 2 or 4) electric motors such that their output shafts would connect directly to the driven wheels, which eliminates the driveshaft/differential combination. This arrangement may not be desirable when retrofitting an older vehicle, but may be chosen when manufacturing a new vehicle.

The following is the preferred sequence of installation for the present Invention:

The fuel, either gasoline or diesel, is placed into the fuel tank where it is transferred out of the fuel tank by the fuel pump into the fuel line. The fuel then flows through the fuel line to the burner where fuel is burned by the burner, which in turn heats the water in the boiler until it boils into steam. The steam then flows from the boiler through the steam line to the steam engine. The steam now expands inside the steam engine which causes the steam engine output shaft to rotate. The steam, which is now water vapor, is transferred through the vapor recovery line to the vapor recovery system, and is reintroduced to the boiler. The rotating output shaft turns the generator which generates electricity.

The electricity flows from the generator through the electric cable into the battery pack. The electricity now flows from the battery pack through the electric cable to the motor controller. The electricity then flows from the motor controller through the electric cable to the electric motor. The electricity acts upon the electric motor which causing the electric motor output shaft to turn.

The electric motor output shaft turns the universal joint, which then turns the driveshaft. The driveshaft turns the differential, which distributes power to the drive axles. The drive axles then turn the drive wheels, which allow the vehicle to be set in motion.

The present invention has a component parts removal and replacement procedure, comprising in combination:
(a) Remove the standard combustion engine, transmission and radiator from an automobile.

(b) Fabricate a mounting plate system so as to mount an electric automobile motor where the transmission was formerly mounted.

(c) Fabricate an attachment mechanism to attach the electric motor to the universal joint where the output shaft of transmission formerly was connected.

(d) Mount and attach the electric motor as previously described.

(e) Mount the battery pack in appropriate location.

(f) Fabricate an attachment mechanism to connect the output shaft of steam engine to generator.

(g) Fabricate a mounting system to attach the steam engine, the generator, the boiler and the burner to vehicle engine compartment area.

(h) Purchase an appropriate motor controller. The controller may need to be fabricated.

(i) Purchase an appropriate boiler/burner combination. This combination may need to be fabricated.

(j) Purchase an appropriate steam engine. The steam engine may need to fabricated.

(k) The steam engine, the boiler/burner combination, the generator and the electric motor are mounted into the engine compartment while being attached to the previously mentioned mounting system.

(l) Attach the fuel line to the burner.

(m) Fabricate the steam lines and attached them to the steam engine.

(n) Purchase an electric cable. Cut the cable into the necessary lengths and attach the necessary connectors to the cable.

(o) Attach the electric cables to the battery pack, the motor controller and the electric motor.

The present invention has a preferred method of operation comprising, in combination;

(1) Insert the ignition key into the ignition lock and turn to the run position; this now enables the circuitry controlling of the electric motor which ignites the burner.

(2) The driver's right foot is placed on the brake pedal which engages the brakes and disengaging the transmission selector lock. The transmission selector is moved to the desired position being "D" for drive or "R" for reverse.

(3) The driver's right foot is placed on the accelerator pedal, and an appropriate amount of pressure is exerted.

(4) An electric signal is sent from the accelerator pedal to the motor controller, which allows an appropriate amount of electricity, in the appropriate polarity, to flow to the electric motor. The electric motor turns, which then propels the vehicle as desired by the driver.

(5) After some time, the water in the boiler heats to 212 degrees, Fahrenheit, and boils which produce steam. The steam then flows from the boiler to the steam engine, acting upon the internal mechanism of the steam engine, causing it to turn the generator. The turning of the generator causes the generation of electricity, which flows to the battery pack, replenishing the electricity used by the electric motor which now allows the operator to operate the vehicle There has thus been outlined, rather broadly, the steam powered hybrid vehicle of the invention in order that the detailed description thereof that follows may be better understood, and in order that the present contribution to the art may be better appreciated. There are, of course, additional features of the present invention that will be described hereinafter and which will form the subject matter of the claims appended hereto.

In this respect, before explaining at least one embodiment of the present invention in detail, it is to be understood that the present invention is not limited in its application to the details of construction and the arrangement of the components set forth in the following description or illustrated in the drawings. The invention is capable of other embodiments and of being practiced and carried out in various ways, also, it is to be fully understood that the phraseology and terminology employed herein are for the purpose of description and should not be regarded as limited.

As such, those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the present application. The abstract is neither intended to define the invention of the application, which is measured by the claims, nor is it intended to be limited as to the scope of the present invention in any way.

It is therefore an object of the present invention to provide a new and improved steam powered hybrid vehicle which has the advantage of the prior art devises and none of the disadvantages.

It is another object of the present invention to provide a new and improved steam powered hybrid vehicle which may be easily and efficiently manufactured and marketed.

It is a further object of the present invention to provide a new and improved steam powered hybrid vehicle which is of a durable and reliable construction.

An even further object of the present invention is to provide a new and improved steam powered hybrid vehicle which is susceptible of a low cost of manufacture with regard to both materials and labor, and which accordingly is then susceptible of low prices of sale to the consuming public, thereby making such steam powered hybrid vehicle economically available to the buying public.

Still yet another object of the present invention is to provide a new and improved steam powered hybrid vehicle which provides in the apparatuses and methods of the prior art some of the advantages thereof, while simultaneously overcoming some of the disadvantages normally associated therewith.

Still another object of the present invention is to provide a new and improved steam powered hybrid vehicle operable from a novice's level.

Yet another object of the present invention is to provide a new and improved system steam powered hybrid vehicle.

These together with other objects of the present invention, along with the various features of novelty which characterize the present invention, are pointed out with a particularity in the claims annexed to and forming a part of this disclosure. For a better understanding of the present invention, it's operating and installation advantages and the specific objects attained by its uses, reference should be had to the accompanying drawings and descriptive matter in which there are illustrated preferred embodiments of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a flat drawing showing the various component parts of the steam powered hybrid vehicle.

DESCRIPTION OF THE PREFERRED EMBODIMENT

FIG. 1 shows the inter-connecting component parts starting with the fuel input line 1 connecting to fuel tank 2, fuel line 3 connecting to boiler/burner 4 and heater line 5 connecting to steam engine 6. Cable 7 connects steam engine 6 to batteries 8 while cable 9 connects the batteries 8 to electric engine 10. Cable 11 connects the electric engine 10 to the ignition 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustration only of the principles of the invention. Further, since numerous modifications and changes will be readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method for producing electricity for a steam powered hybrid vehicle, said hybrid vehicle comprising, in combination:
    an internal combustion engine;
    at least one fuel tank means;
    at least one fuel pump means;
    at least one fuel line means;
    at least one burner means;
    at least one boiler means;
    at least one steam line means;
    at least one steam engine means;
    at least one vapor recovery line means;
    at least one vapor recovery mechanism means
    at least one steam engine output shaft means;
    at least one generator means;
    at least one electric cable means;
    at least one battery pack means;
    at least one electric cable means;
    at least one motor controller means;
    at least one electric cable means;
    at least one electric motor means;
    at least one electric motor output shaft means;
    at least one universal joint means;
    at least one driveshaft means;
    at least one differential means;
    at least one drive axle means;
    at least one drive wheels means;
the method for producing electricity of said steam powered hybrid vehicle comprising a sequence of installation including a preferred remove and replace procedure and a preferred method of operation for said vehicle, wherein said preferred component parts removal and replacement procedure comprising the following steps in the specific order:
    (a) removing said standard combustion engine, transmission and radiator from the vehicle;
    (b) fabricating a mounting plate system so as to mount said electric automobile motor where the transmission was formerly mounted;
    (c) fabricating an attachment mechanism to attach said electric motor to said universal joint where said output shaft of said transmission formerly was connected;
    (d) mounting and attaching said electric motor as set forth in step c;
    (e) mounting said battery pack in an appropriate location;
    (f) fabricating another attachment mechanism to connect said output shaft of steam engine to said generator;
    (g) fabricating a mounting system to attach said steam engine, said generator, said boiler and said burner to the vehicle engine compartment area;
    (h) fabricating and setting an appropriate motor controller;
    (i) fabricating and setting an appropriate boiler/burner combination;
    (j) fabricating and setting the steam engine;
    (k) said steam engine, said boiler/burner combination, said generator and said electric motor are mounted into said engine compartment while being attached to the previously mentioned mounting system;
    (l) attaching said fuel line to said burner;
    (m) fabricating said steam lines and attaching them to said steam engine;
    (n) cutting an electric cable into the necessary lengths and attaching to necessary connectors; and
    (o) attaching said electric cables to said battery pack, said motor controller and said electric motor.

2. The method for producing electricity for a steam powered vehicle as set forth above in claim 1, wherein said preferred method of operation comprising the following steps in order;
    (a) inserting the ignition key into the ignition lock and turning to the run position; this now enables the circuitry controlling of said electric motor which in turn enables ignition of said burner;
    (b) placing the drivers right foot on the brake pedal which engages the brakes and disengaging a transmission selector lock; the transmission selector is moved to the desired position being "D" for drive or "R" for reverse;
    (c) placing the driver's right foot on the accelerator pedal, and inserting an appropriate amount of pressure;
    (d) sending an electric signal from the accelerator pedal to said motor controller, which allows an appropriate amount of electricity, in the appropriate polarity, to flow to said electric motor said electric motor turns which then propels said vehicle as desired by the driver; and
    (e) heating the water in the boiler to 212 degrees Fahrenheit to produce steam, said steam then flows from said boiler to said steam engine which acts upon the internal mechanism of said steam engine, causing it to turn said generator; while the turning of said generator causes generation of electricity, which flows to said battery pack, replenishing the electricity used by said electric motor to operate the vehicle.

\* \* \* \* \*